United States Patent Office 3,418,678
Patented Dec. 31, 1968

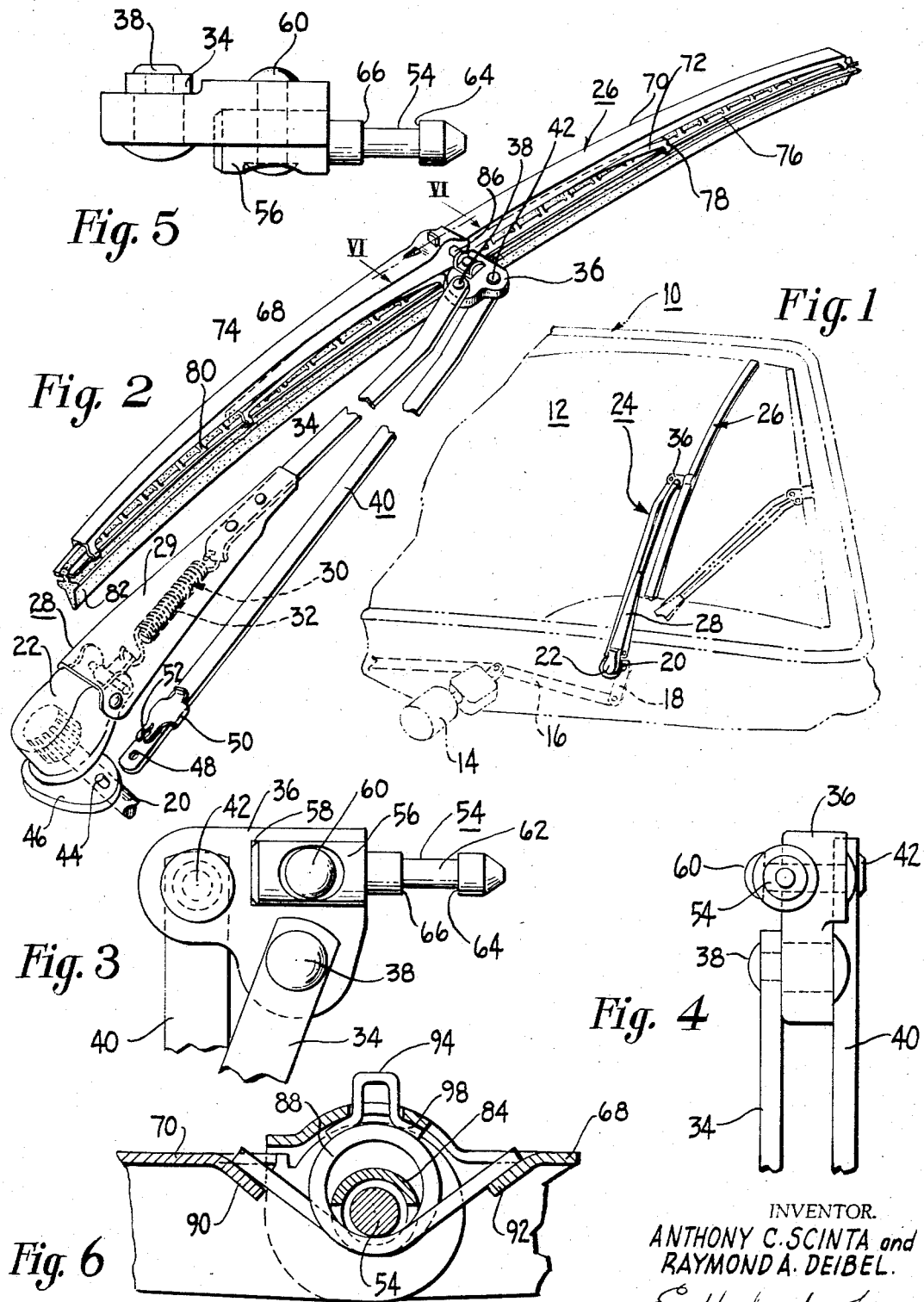

3,418,678
WINDSHIELD WIPER ARM AND BLADE
ASSEMBLY
Raymond A. Deibel, Cheektowaga, and Anthony C. Scinta, Hamburg, N.Y., assignors to Trico Products Corporation, Buffalo, N.Y.
Filed June 10, 1966, Ser. No. 556,715
6 Claims. (Cl. 15—250.23)

ABSTRACT OF THE DISCLOSURE

A windshield wiper arm and blade combination for motor vehicles in which a primary wiper arm is pivoted to a pivot block at its free end and includes a mounting section for securement to a pivot shaft at its other end. A drag link is pivoted at the pivot block on an axis parallel to, but spaced from the pivotal axis of the primary wiper arm and is adapted to be pivotally secured to an axis parallel to, but spaced from the pivot shaft at its other end. The blade includes within its profile a transverse opening for reception of a pin secured to the pivot block having its axis in the plane of the pivot block. The pin is releasably retained within the transverse opening by a coil spring, which coil spring is also utilized for distributing arm pressure to a pair of levers. The pin includes opposed shoulders between which the coil spring is disposed. Means for depressing the coil spring to permit removal of the blade is provided.

The present invention relates to an improved construction for a compound oscillating windshield wiper arm and blade assembly and, more particularly, to an improved means for connecting a compound oscillating windshield wiper arm to a blade.

Windshields on modern automobiles are so shaped as to require not only oscillating pivotal movement of a wiper arm about a fixed pivot shaft, but also pivotal movement of the blade relative to the arm in a plane substantially parallel to the windshield or, in effect, compound oscillating movement. Such movement has been accomplished by providing additional linkage on the wiper arm which produces blade movement relative to the primary arm as the blade oscillates in its path across the windshield. For safety reasons it is desirable to provide as low a profile wiper arm and blade assembly as possible. A low profile assembly also enhances the appearance and makes it possible to provide for concealment of the arm and blade assembly in the parked position. A trend toward such concealment, for safety as well as appearance purposes, is taking place.

The present invention contemplates the use of a side mounted blade on a compound oscillating arm wherein the profile of the arm assembly lies within the confines of the profile of the blade. This is accomplished by utilizing the transverse pivotal axis of the blade as a latching receptor for the connecting means on the arm. Such a construction results in economy since certain existing elements on the blade are utilized for latching purposes and certain of the elements on the connecting means form a dual or multipurpose element.

The principal object of the present invention is to provide an improved compound oscillating wiper arm assembly having an extremely low profile.

It is another object of the invention to provide a simple, economical, compound oscillating wiper arm assembly which is of extremely low profile and which includes readily detachable blade connector means to facilitate blade removal and replacement.

A further and more specific object of the invention is to provide a compound oscillating arm and side mounted blade assembly for effecting compound blade oscillation which is simple and economical to manufacture, which utilizes existing elements in conventional blades and in which certain of the connector elements are multipurpose elements.

Other objects and advantages of the invention will be apparent from the following detailed description taken in connection with the accompanying drawings in which:

FIG. 1 is a fragmentary perspective view of a motor vehicle showing one embodiment of the improved wiper arm and blade assembly of the present invention;

FIG. 2 is a perspective view of the arm and blade assembly of the invention;

FIG. 3 is a top elevational view of the connecting assembly of the arm;

FIG. 4 is a side elevational view of the structure shown in FIG. 3;

FIG. 5 is an end elevational view of the structure shown in FIG. 3; and

FIG. 6 is a sectional view taken on line VI—VI of FIG. 2.

Briefly, the invention comprises a wiper arm and blade assembly utilizing blade connection receptor means like that shown in application Ser. No. 556,716, now Patent No. 3,378,874, filed concurrently herewith, by Anthony C. Scinta and assigned to the assignee of the present invention. In this construction the uppermost lever structure of the superstructure has transverse blade connection receptor means extending therethrough substantially centrally of the blade which lies within the confines of the profile of the arm superstructure. The specific blade shown for purposes of illustration is of the type having a pair of channel-shaped lever members pivoted together centrally of the blade and biased by a coil spring to conform to the contour of the windshield. Tubular means as, for example, open rivets, are provided to secure the levers together and to provide a pivotal axis for relative movement between the levers. A coil spring is located in substantial alignment, but biased eccentric to the tubular means. The wiper arm assembly includes a connecting pin at the free end thereof extending at an angle to the longitudinal axis of the arm. The connecting pin is receivable in the tubular receptor on the wiper blade superstructure. The arm connecting pin has a reduced diameter portion intermediate its ends forming a pair of annular opposed shoulders which latchingly engage the coil spring and is thereby retained within the tubular receptor by the coil spring due to the eccentric disposition of the spring. Access to the spring is provided from the exterior of the superstructure to permit pressing the spring against its bias into concentricity with the pivotal means. This permits disengagement of the spring and the pin thus permitting removal of the blade from the arm by movement of the blade transverse to the longitudinal axis of the arm. The connecting pin is mounted on a pivot block having a pair of parallel pivotal axes. To one of these axes is pivotally mounted the free end of the wiper arm and to the other of these axes is pivoted a drag link. At its other end the wiper arm is secured to a motor driven pivot shaft for oscillatable movement therewith and the drag link is anchored for pivotal movement about an axis parallel to the axis of the pivot shaft and closely adjacent thereto.

In FIG. 1 an automotive vehicle 10 is shown having a windshield 12 mounted thereon in a conventional manner. Suitably mounted underneath the cowl or on the fire wall of the vehicle is a wiper motor and gearbox assembly 14. Linkage 16 is suitably connected for driving engagement by motor 14. The linkage in turn oscillates a pair of pivot shafts or rockshafts 20 through crank arms 18. For simplification only one pivot shaft and crank arm is shown, but it will be understood that a similar arrangement of linkage and wiper arm and blade assembly is provided on the side of the windshield not shown. Pivot shafts 20 are journaled for rotation in the cowl of the vehicle. The pivot shafts, or rock-shafts 20, each receive mounting head portion 22 of a wiper arm 24 which mounts a wiper 26 at the outer end thereof. As is well known in the art, when the wiper motor 14 is placed in operation, wipers 26 will be caused to oscillate back and forth across the windshield to remove moisture therefrom.

Wiper arm assembly 24 may include a primary wiper arm 28 of any suitable construction. By way of example, an arm 28 is illustrated which includes a mounting head portion to which is pivotally attached a spring chamber 29. A biasing means 30 is illustrated which includes a spring 32 anchored at each end. The spring 32 extends between spring chamber 29 and the mounting head portion 22. The outer end of spring chamber 29 mounts bar stock member 34. The bar stock member 34 is pivoted on its outer end to a pivot block 36 as at axis 38.

A drag link or secondary arm member 40 is pivotally attached to the pivot block 36 on the opposite side from arm 28 about an axis displaced from, but parallel to the axis 38 as at axis 42. The drag link 40 may be of any suitable construction as, for example, bar stock similar to bar stock member or extension 34 of arm 28. At its other end drag link 40 is pivotally connected to an axis parallel to and adjacent the rockshaft 20. The axis to which the drag link 40 is connected may be a pivot pin 44 secured to the escutcheon plate 46 which journals the rockshaft 20. As shown, the drag link 40 includes an opening 48 at its inner end in which is received the pivot pin 44. The pivot pin 44 may include an annular recess, not shown, at its outer end. A slidable latching member 50 is provided on drag link 40 with a bifurcated end 52 which engages the annular recess on pin 44 for retaining the drag link in position. The opening 48 is of such dimensions relative to the pin 44 that it is slidable and tiltable to provide articulation. This permits the arm to be raised off the surface of the windshield for cleaning purposes. It will, of course, be understood that in accordance with the broader aspects of the invention, other suitable and desirable pivot structure may be provided at its inner end on drag link 40.

Pivot block 36 has rigidly secured thereto a connecting pin 54 extending at substantially right angles to the longitudinal axis of the arm extension 34. It is obvious, of course, that since the pivot block 36 is pivotally connected to the arm extension 34, the angle between the axis of the pin and the longitudinal axis of the arm extension 34 will vary within limits when the wiper is operating. It should also be understood that within the broader aspects of the invention, the average angle between the longitudinal axis of the arm extension 34 and the axis of the pin 54 may be somewhat greater or less than 90°. The connecting pin 54 may also, in accordance with the broader aspects of the invention, be formed integral with pivot block 36. Connecting pin 54 includes, either rigidly secured thereto or integral therewith, a mounting block 56 which, as shown, is securely riveted to pivot block 36 in a notch 58 thereof to prevent movement of the connecting pin 54 relative to the pivot block 36. Although the mounting block 56 is connected to the pivot block 36 by riveting as at 60, any other suitable or desirable connecting means as, for example, welding, may be employed. The extended portion of connecting pin 54 has a reduced diameter portion 62 forming opposed shoulders 64 and 66 and is similar to the corresponding connecting pin in copending application Ser. No. 556,716.

Although in accordance with the broader aspects of the invention, any suitable type of wiper blade may be utilized in the assembly of the present invention, by way of example the blade 26 shown in FIG. 2 comprises a pair of channeled levers 68 and 70 pivoted together at adjacent ends centrally of the blade. A lever 72 is pivoted intermediate its end at the pivot point between levers 68 and 70 and is pivotally connected at one end to a yoke 74. At its other end, lever 72 is slidably engaged to a backing strip 76 by claws 78. The yoke 74 is slidably connected at each end to the backing strip 76. The backing strip 76 comprises a pair of longitudinal side rails secured together by bridges 80. The side rails are received in longitudinal grooves on opposite sides of the rubber element 82.

The levers 68, 70 and 72 may be secured together by a tubular cylindrical member 84 (FIG. 6) extending transversely through openings 86 in the side walls of the U-shaped levers. The tubular member 84 may be flanged at its outer ends to maintain the structure in assembled relationship. A coil spring 88 circumscribes the tubular member and has its free ends engaging struck-out portions 90 and 92 of levers 68 and 70, respectively, for distributing pressure through the levers to the ends of the blade. The tubular member 84 has a portion of its side wall cut away for the length of the coil spring 88. The coil spring is biased with its axis eccentric to the axis of the tubular member 84 due to the engagement of its free ends with struck-out portions 90 and 92. Instead of utilizing a single tubular member 84, a pair of tubular members on the same axis may be utilized to connect each leg of the U-shaped levers together. In this case, the coil spring extends between the pair of tubular members.

The arm and blade assembly is connected together by inserting the pin 54 transversely through the tubular member 84 or its equivalent whereupon the spring is biased to a position whereby it is disposed for engagement with the shoulders 64 and 66 to prevent transverse movement of the pin 54. The pin 54 and the coil spring 88 thereby form a latch for retaining the arm and blade assembly in assembled condition. The pin 54 further provides a pivotal axis for rotational movement of the blade relative to the arm. The tubular structure 84 or its equivalent forms a bearing for the pin 54. The pin 54 further provides reinforcement for the hollow tubular structure 84 or its equivalent. Thus the hollow tubular structure 84 constitutes receptor means for the pin 54 as well as bearing means. An opening in the web of the channel-shaped superstructure levers 68 and 70 is provided to give access to the spring 88 whereby it may be manually depressed to a concentric position relative to the receptor means 84 to permit disassembly of the arm from the blade.

A manual push button 94 having at its ends semi-circular formations 96 and 98 engageable with the periphery of the spring may be provided for assisting in manually depressing the spring to disengage the arm and blade.

It can thus be seen that a compound oscillating arm and blade assembly has been provided. The operation of the arm and blade assembly should now be apparent. As the arm oscillates with the rockshaft 20, the drag link oscillates about a pivot 44 displaced from the rockshaft, thereby causing pivotal movement of the pivot block 36 about the pivotal axis 38 relative to the primary arm 28, thus varying the angle between the longitudinal axis of the primary arm 28 and the longitudinal axis of the blade 26 as the blade traverses its path thus providing compound oscillation. This enables an otherwise unwipable portion of the windshield to be cleaned. It can be seen that the outer end of the arm assembly lies completely within the profile of the wiper blade and is readily detachable. Depression of the push button 94 depresses the coil spring 88 to permit disengagement between pin 54 and the coil spring, thereby enabling removal of the blade from the arm assembly by lateral movement of the blade.

A certain specific embodiment of the invention has been described for the purpose of illustration, but it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. A low profile windshield wiper arm assembly comprising a pivot block, an arm element having mounting means at one end for securement to a pivot shaft and being pivotally secured at its other end to said pivot block about a fixed axis, a drag link pivotally secured at one end to said pivot block on a second axis parallel to but spaced from said first axis, said drag link having connecting means at its other end for anchoring on an axis for rotational movement and a cantilever connector pin secured to said pivot block for releasably attaching a side mounted wiper blade to said arm assembly, said wiper blade having a transverse receptor with an opening therein for receiving said connector pin, said connector pin having its axis in the plane of said pivot block and forming a pivotal axis for the wiper blade.

2. A low profile windshield wiper arm and blade combination including an arm assembly and a blade assembly releasably connected thereto, said arm assembly comprising a pivot block, an arm element having mounting means at one end for securement to a pivot shaft and being pivotally secured at its other end to said pivot block, a drag link pivotally secured at one end to said pivot block on a second axis parallel to but spaced from said first axis, said drag link having connecting means at its other end and a cantilever connector pin secured to said pivot block for connecting said blade to said arm, said blade including a pressure distributing superstructure having a substantially centrally disposed latching receptor for latchingly and releasably receiving said connector pin transversely of said superstructure for pivotal movement of said blade on the axis of said pin.

3. A combination according to claim 2 including externally actuatable means for effecting release of said connector pin from said latching receptor.

4. A combination according to claim 3 wherein said latching means includes a coil spring normally biased eccentrically with respect to said latching receptor, said pin being concentric with said receptor and engageable with said coil spring when the coil spring is in its eccentric position.

5. A combination according to claim 4 wherein said externally actuatable means includes means in operative engagement with said coil spring to effect displacement thereof to a position whereby said pin may be released from said receptor.

6. A combination according to claim 5 wherein said superstructure comprises a pair of pressure distributing levers having adjacent ends pivoted together at said receptor and wherein the free ends of said coil spring bear on said levers to provide biasing means therefor.

References Cited

UNITED STATES PATENTS

| | | | |
|---|---|---|---|
| 2,752,626 | 7/1956 | Oishei | 15—255 |
| 2,953,804 | 9/1960 | Roberts et al. | 15—250.42 |
| 3,006,017 | 10/1961 | Krohm et al. | 15—250.37 |
| 3,076,991 | 2/1963 | Macpherson | 15—250.23 |
| 3,132,367 | 5/1964 | Wise | 15—250.42 |

WALTER A. SCHEEL, *Primary Examiner.*

ROBERT I. SMITH, *Assistant Examiner.*

UNITED STATES PATENT OFFICE
CERTIFICATE OF CORRECTION

Patent No. 3,418,678

December 31, 1968

Raymond A. Deibel et al.

It is certified that error appears in the above identified patent and that said Letters Patent are hereby corrected as shown below:

Column 5, line 6, "fixed" should read -- first --; line 22, after "block" insert -- about a first axis --.

Signed and sealed this 17th day of March 1970.

(SEAL)
Attest:

Edward M. Fletcher, Jr.

Attesting Officer

WILLIAM E. SCHUYLER, JR.

Commissioner of Patents